April 2, 1963
T. N. KELLY
3,083,975
SHAFT SEALS
Filed April 13, 1959
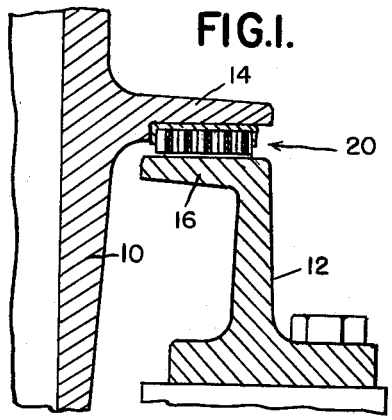
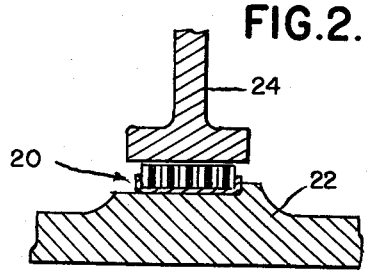
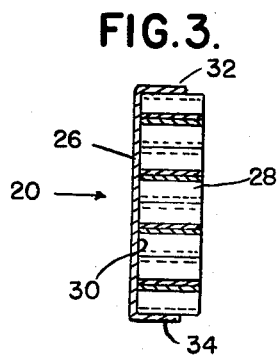
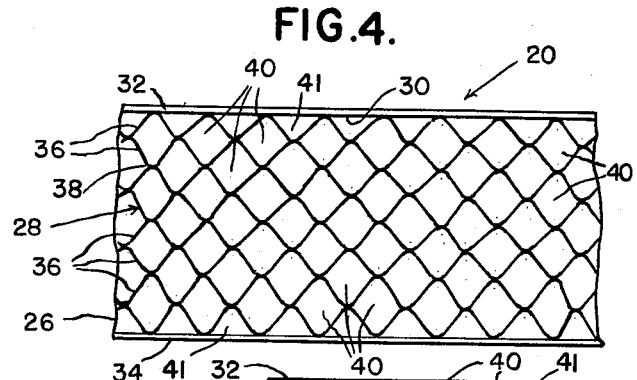
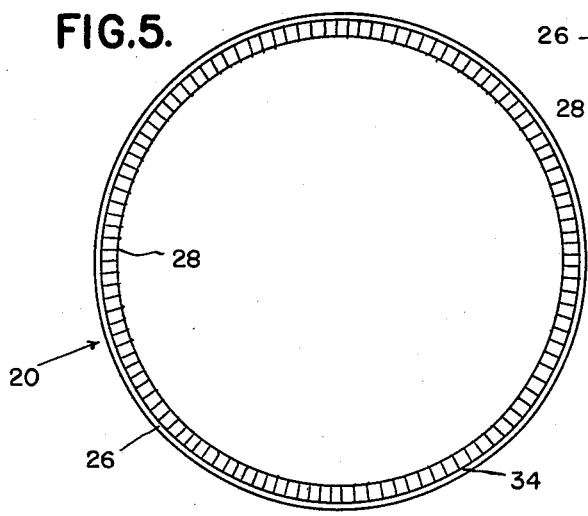
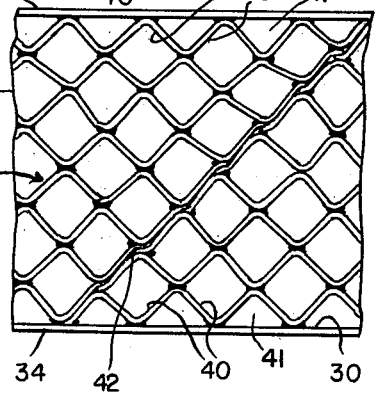
INVENTOR.
THOMAS N. KELLY
BY
Whittemore, Hulbert & Belknap
ATTORNEYS

United States Patent Office 3,083,975
Patented Apr. 2, 1963

3,083,975
SHAFT SEALS
Thomas N. Kelly, Detroit, Mich., assignor to Aircraft Precision Products, Inc., Oak Park, Mich., a corporation of Michigan
Filed Apr. 13, 1959, Ser. No. 805,954
2 Claims. (Cl. 277—53)

This invention relates generally to shaft seals and the like, and refers more particularly to labyrinth type seals and their method of manufacture.

Labyrinth seals are referred to as cellular and pressure seals, and are a form of seal or packing used to prevent leakage between relatively rotating, or rotating and stationary, members. They are commonly known for their use as pressure seals in axial flow compressors, turbines, and other rotating shaft equipment to prevent back flow along the shaft of the compressor, turbine or the like.

In compressors, turbines and similar rotating shaft equipment a labyrinth type seal having a multiplicity of sharp edged orifices in close but spaced contact to a relatively rotating part is highly desirable. However, it will be appreciated that in high speed and high thermal conductive equipment of the type mentioned there is a problem of thermal conductivity. High temperatures due to friction or other factors are readily transmitted to conductive materials and can cause failure by burning.

Thus far labyrinth type seals have been formed as an integral part of one of the relatively rotating members, wherein the seal is required, to avoid rather than eliminate the heat conductive problem at the base of the seal structure. To minimize the cost of such seals, both because of the integral construction required and of the problems of machining a major component part of the seal receiving equipment, the cellular formation has been required to be relatively simple. The normal form is a plurality of annular ribs of one or another cross-sectional shape. In seals of this type there is some heat dissipation in the seal forming annular fins, and such heat, as is conducted to the base of the seal, is transmitted directly into the part from which the seal structure is formed. Accordingly, failure of the seal at its junction with the part from which formed, is minimized.

Heretofore, insofar as I am aware, no one has proposed or suggested the use of a separate member having a multiplicity of separate and isolated recesses or orifices, for forming a labyrinth type seal, and a successful method of manufacture thereof.

This invention discloses a pressure seal including a honeycomb section which is suitably formed and secured to a retaining ring to provide a separate rather than integral sealing member. As a separate unit the seal is more easily installed and more readily replaced. Further, its malfunction does not require the replacement of an expensive component part but only of the relatively inexpensive seal itself. The method of manufacture employed produces a highly successful seal for its intended purpose without concern for burn-out between the seal and its retaining ring structure.

It is an object of this invention to disclose a cellular or labyrinth type pressure seal which is usable between concentric surfaces of relatively rotating parts and the like, and which comprises a replaceable separate sealing assembly rather than an integral part of a major component of the seal receiving equipment in which the seal is used.

It is another object of this invention to disclose a pressure seal comprising a preformed retainer ring and a honeycomb liner for said ring, wherein the liner has a multiplicity of separate and isolated recesses or orifices provided with sharply defined multiple outer edges having good sealing characteristics.

It is also an object of this invention to disclose a pressure seal formed from a thin-walled honeycomb structure for maximum effective heat dissipation.

Another object of this invention is to disclose a particular effective method of forming a honeycomb section to provide a cellular seal of annular shape.

Still another object of this invention is to disclose a method of making a successful labyrinth seal separate from rather than integral with, any major component part of the seal receiving structure.

A further object of this invention is to disclose a method of securing a labyrinth-forming honeycomb section to a retainer ring with immunity to problems of burn-out and failure therebetween.

These and other objects and advantages in the practice of this invention will be more apparent upon a reading of the following specification; in conjunction with the accompanying drawing, wherein:

FIGURE 1 is a fragmentary cross-sectioned view through a stationary housing and a rotating member, with the disclosed seal of this invention interposed between concentric flanges thereof and affixed to the flange of said housing, and showing parts broken away and in section.

FIGURE 2 is a fragmentary cross-sectioned view through a stationary member and a rotating shaft, with the disclosed seal of this invention interposed between concentric portions thereof and affixed to the rotating shaft, and showing parts broken away and in section.

FIGURE 3 is an enlarged cross-sectional view through the disclosed pressure seal.

FIGURE 4 is a fragmentary elevational view of the seal structure shown in FIGURE 3.

FIGURE 5 is an enlarged edge view of the pressure seal disclosed by this invention, disposed separate from any equipment in which it might be used.

FIGURE 6 is a further enlarged fragmentary elevational view of the seal structure to show the joint between abutting ends of the honeycomb member.

Referring to the drawings in further detail:

In FIGURE 1 there is shown a stationary housing 10 having a rotatable member 12 disposed next adjacent thereto. The housing member 10 includes an annular flange or collar 14, and the rotatable member 12 includes a peripheral flange 16 arranged within and concentric with said annular flange 14. Between these closely disposed but spaced flanges 14 and 16 is disposed the seal 20.

In FIGURE 2 the seal 20 is shown mounted on a rotatable shaft 22 and disposed in sealing relation to a stationary member 24 through which the rotatable shaft extends.

The two illustrated embodiments, just mentioned, disclose the seal 20 having an inner peripheral sealing surface or an external peripheral sealing face. It is also foreseeable that the sealing member 20 could be formed to have its sealing face radially disposed.

The seal 20 comprises a retaining ring 26 and a honeycomb member 28.

The retainer ring 26 is formed from strip material and is channel shaped in cross-section. Preferably the channel formation 30 of the ring opens inwardly and includes a pair of spaced parallel annular side walls 32 and 34 between which the honeycomb member 28 is received.

The honeycomb member 28 is preformed and initially is a straight length. In the assembly illustrated, the initially straight preformed honeycomb member 28 has been curved lengthwise in an arc of a circle and is formed of separate thin or light gauge narrow corrugated strips 36 disposed at substantially right angles to the base of the channel formation 30 and arranged in parallel rows. Alternate apices of the corrugations of one strip engage and are secured to alternate apices of the corrugations of the next adjacent strip, as at 38. This forms a multiplicity of separate and individual diamond-shaped cells or orifices 40 having flush sharply defined outer edges which are disposed outwardly beyond the edges of the side walls 32 and 34 of the channel formation and have good sealing characteristics.

The honeycomb member 28 is preferably formed so that it will fit snugly between the side walls 32 and 34 of the channel formation 30 of the retainer ring, and alternate apices of the corrugations of the strips 36 at opposite sides of said honeycomb member 28 may engage and may be rigidly secured to the side walls 32 and 34 to form additional separate outwardly opening triangular-shaped cells 41 that are approximately one-half the size of the diamond-shaped cells 40.

Preferably the length of the preformed honeycomb member 28 is such relative to the inside diameter of the retainer ring 26 that the ends of said honeycomb member will firmly abut each other in end to end relation after said member 28 is inserted within the ring 26. Thus no separate fixtures are required to hold said ends together when the member 28 is inserted into the ring 26.

Referring to FIGURE 6, it will be noted that the abutting opposite ends of the honeycomb member 28 are preferably cut at complementary angles extending diagonally across said member from one side edge to the other thereof to form a continuous diagonal line of contact therebetween, as at 42. This arrangement provides a much more dependable connection between the ends of the honeycomb member than would be had if the ends were cut straight across at right angles to the longitudinal median line of said member. Further, the honeycomb pattern is not disrupted at the abutting ends of the member 28. In fact, the honeycomb pattern or formation is uniform throughout the circumference of the annulus formed by the member 28.

The seal 20 is preferably assembled in the following manner:

The retainer ring 26 is preformed to the desired size and shape mentioned.

The initially straight elongated honeycomb member 28 is curved lengthwise in the arc of a circle by a rolling operation to the annular shape it is to assume in the retainer ring 26 of the seal assembly. Then, before being inserted within the retainer ring 26, the outer surface of said honeycomb member 28 is coated with a lacquer binder that in turn is subsequently provided with a coating of brazing compound in powder form. In fact, the curved honeycomb member 28 may be rolled in the brazing compound after the outer surface thereof has been coated with the lacquer binder so that the compound is picked up only by the lacquer coated outer surface thereof. Opposite ends of said curved member are also coated with lacquer and brazing compound, and if desired, alternate apices of the corrugations of the strips 36 at opposite sides of the curved member may likewise be coated with lacquer and brazing compound.

The curved coated honeycomb member 28 is then placed within the annular retainer ring 26, with the coated surface of said member against the base of the channel formation 30 of said ring, and with opposite ends of said member in abutting end to end relation. The honeycomb member 28 is then tack or spot welded at circumferentially spaced points thereof to the retainer ring 26 for temporary attachment thereto, and the ends of said honeycomb member 28 are also tack or spot welded together for temporary attachment to each other.

Subsequently, the entire seal assembly is placed in a suitable furnace wherein the temperature is raised sufficiently to reach the fusing temperature of the brazing compound. This causes the coated surface portions of the honeycomb member 28 to be permanently bonded to the retainer ring, and causes the ends of said member 28 to be permanently bonded to each other.

The temperature required for the operation described varies with the type of brazing compound used. A brazing composition of chrome, nickel and manganese has been found to require about 2100 degrees centigrade.

The resulting seal structure 20 is one which includes a multiplicity of small, separate, deep substantially diamond-shaped recesses or orifices provided with sharply defined multiple outer edges having good sealing characteristics and of thin dividing wall or partition construction for best heat dissipation.

The proposed seal is usable in axial flow turbines or compressors to prevent back flow along or any flow longitudinally of the turbine or compressor shaft. The retainer ring is preferably press-fitted to a receiving member within a suitable receiving recess; but is in all instances intended to be removable and replaceable. The outer exposed honeycomb surface of the member 28 is to be in closely-spaced but non-contacting relation with the other relatively movable part of the seal receiving structure.

The seal disclosed may be used as an interstage sealing means where several are used, and are disposed between stators of an axial flow compressor or turbine wherein fluids are employed.

The seal is best used where pressure differentials are to be maintained. Such seal is not a contact seal, and relies upon the multiplicity of orifices having sharply defined outer edges to obtain the desired sealing effect.

In high temperature environments the retainer ring 26 and honeycomb member 28 would both be formed from stainless steel or like composition and would be brazed together as described. However, in low temperature conditions the retainer and honeycomb member could be made of a fibrous or plastic material and could be secured together by other suitable bonding or adhesive substances.

The drawing and the foregoing specification constitute a description of the improved shaft seals in such full, clear, concise and exact terms as to enable any person skilled in the art to practice the invention, the scope of which is indicated by the appended claims.

What I claim as my invention is:

1. A replaceable two-part cellular structure for use as a seal between relatively rotatable members, comprising a retainer ring of channel-shaped cross-section having the channel thereof opening radially, and an annulus formed from a longitudinally curved elongated honeycomb member having the opposite ends thereof secured together in abutting end-to-end relation, said annulus being secured concentrically within said channel and having a plurality of circumferentially extending corrugated strips, alternate apices of the corrugations of adjacent strips being connected together to form a multiplicity of separate outwardly opening cells, said abutting ends of said honeycomb member extending diagonally with respect to the median line of said channel at an acute angle thereto, atlernate cell-forming walls of said strips extending diagonally with respect to said median line at the same acute angle as said abutting ends, said strips terminating at one end in cell-forming walls which extend in end-to-end continuation of one another at the aforesaid acute angle and cooperate to define one of the abutting ends of said honeycomb member, said strips terminating at the opposite ends thereof in cell-forming walls which extend in end-to-end continuation of one another at the aforesaid acute angle and cooperate to define the other of the abutting ends of said honeycomb member, the cell-forming walls defining one of said abutting ends being secured to those of the other of said abutting ends in surface-to-surface relation, whereby a uniform, uninterrupted cellular configuration is provided by said honeycomb member throughout the full 360° of its circumference.

2. The cellular structure defined in claim 1, wherein said annulus extends radially outwardly beyond said channel and the outer edges of said strips are disposed flush with one another to provide an even cellular sealing surface unobstructed by the side walls of said channel.

References Cited in the file of this patent

UNITED STATES PATENTS

| | | |
|---|---|---|
| 2,020,986 | Anoschenko | Nov. 12, 1935 |
| 2,756,496 | Holland | July 31, 1956 |
| 2,878,560 | Gier | Mar. 24, 1959 |
| 2,886,351 | Heard | May 12, 1959 |
| 2,963,268 | Smile et al. | Dec. 6, 1960 |
| 2,963,307 | Bobo | Dec. 6, 1960 |

FOREIGN PATENTS

| | | |
|---|---|---|
| 407,012 | France | Dec. 20, 1909 |
| 793,886 | Great Britain | Apr. 23, 1958 |